(12) United States Patent
Teller et al.

(10) Patent No.: US 7,972,008 B2
(45) Date of Patent: Jul. 5, 2011

(54) PROJECTION SYSTEM USING HIGH-FREQUENCY DRIVE MODULATION TO REDUCE PERCEIVED SPECKLE

(75) Inventors: Witold R Teller, Pullman, WA (US); Alban N Lescure, Redmond, WA (US); Mark O. Freeman, Snohomish, WA (US)

(73) Assignee: Microvision, Inc., Redmond, WA (US)

( * ) Notice: Subject to any disclaimer, the term of this patent is extended or adjusted under 35 U.S.C. 154(b) by 526 days.

(21) Appl. No.: 12/255,639

(22) Filed: Oct. 21, 2008

(65) Prior Publication Data

US 2010/0097534 A1 Apr. 22, 2010

(51) Int. Cl.
*H04N 5/74* (2006.01)
(52) U.S. Cl. .......................... 353/31; 348/471
(58) Field of Classification Search ............... 353/20, 353/31; 348/104, 471, 641; 349/10
See application file for complete search history.

(56) References Cited

U.S. PATENT DOCUMENTS

| | | | | | |
|---|---|---|---|---|---|
| 3,934,265 | A | * | 1/1976 | Tanaka et al. ............. | 348/104 |
| 3,967,312 | A | * | 6/1976 | Sample .................. | 348/641 |
| 4,675,721 | A | * | 6/1987 | Dirr ..................... | 348/471 |

* cited by examiner

*Primary Examiner* — Seung C Sohn
(74) *Attorney, Agent, or Firm* — Kevin D. Wills

(57) ABSTRACT

An image producing system (1400) delivers images (1414) having reduced speckle by employing one or more drive circuits (1404, 1405, 1406) that deliver both a direct current drive signal (205) and an alternating current drive signal (405) to one or more lasers (1401, 1402, 1403). Specifically, an alternating current drive circuit (403) is used in conjunction with a direct current drive circuit (203) to modulate a drive signal. The modulation can be at a frequency of between 400 MHz and 600 MHz. When lasers, such as the red laser (1401) or the blue laser (1403) of a multi-laser system are modulated in such a fashion, their emitted spectral widths (407) greatly expand, thereby reducing speckle in projected images (1414).

20 Claims, 13 Drawing Sheets

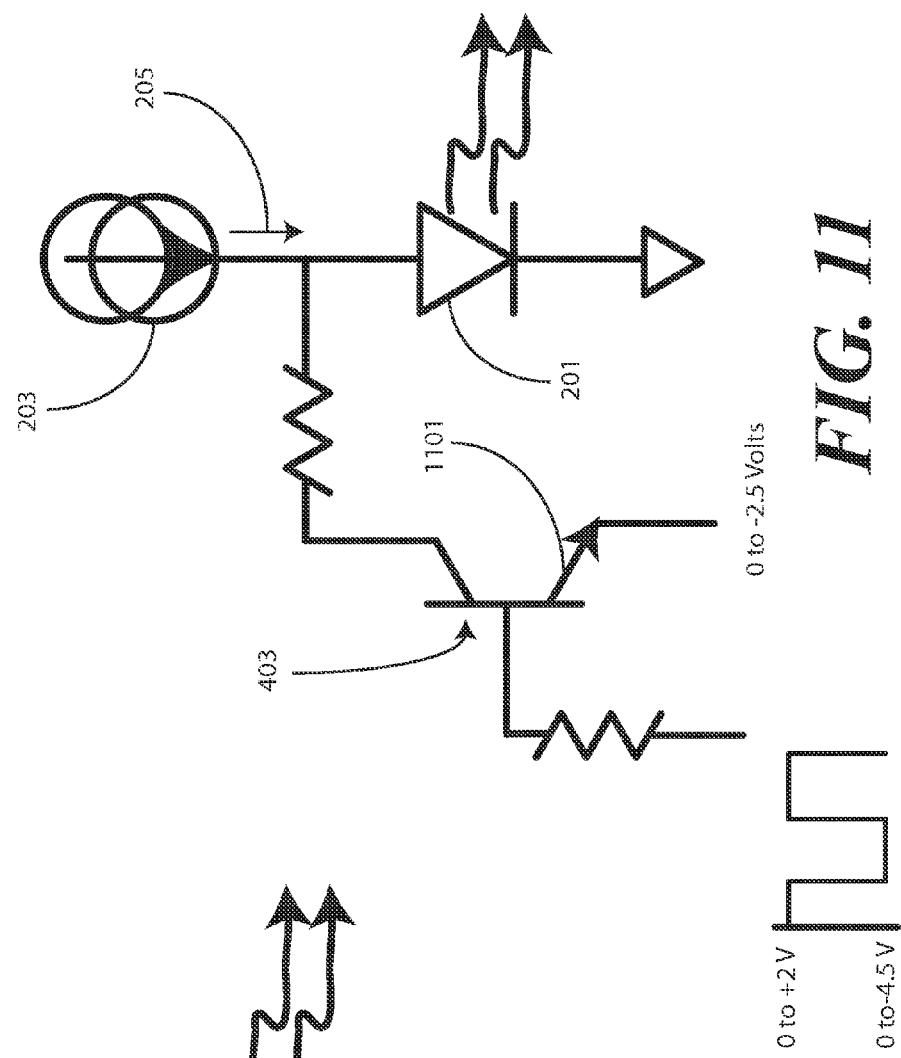
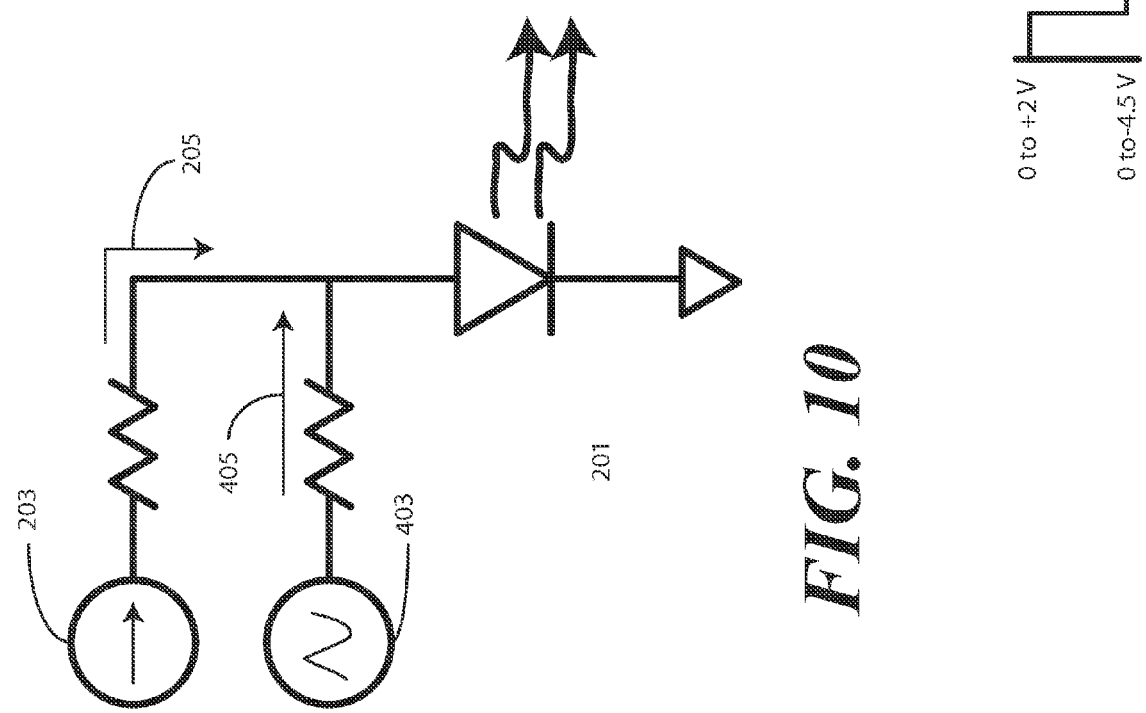
FIG. 11
FIG. 10

PROJECTION SYSTEM USING HIGH-FREQUENCY DRIVE MODULATION TO REDUCE PERCEIVED SPECKLE

BACKGROUND

1. Technical Field

This invention relates generally to optical projection systems configured to reduce perceived speckle, and more particularly to a laser-based system employing a high-frequency AC drive signal modulated on a DC drive signal to induce a controlled chaos in selected lasers, thereby broadening those lasers' spectral widths to reduce speckle as perceived by a viewer.

2. Background Art

Laser projection devices facilitate the production of brilliant images created with vibrant colors. The image quality associated with laser-based projection systems is unmatched by systems using conventional projection devices. The advent of semiconductor lasers, such as laser diodes, allows these brilliant images to be created at a reasonable cost, while using small amounts of power. Laser diodes are small, compact, and relatively inexpensive. Further, the light from laser diodes is easily modulated to form complex images.

One practical drawback associated with using lasers in projection systems is the image artifact known as "speckle." Speckle occurs when a coherent light source is projected onto an imperfect projection medium. As the light is highly coherent, when it reflects off a rough surface, components of the light combine with other components to form patches of higher intensity light and lower intensity light. In a detector with a finite aperture, such as a human eye, these varied patches of intensity appear as speckles, as some small portions of the image look brighter than other small portions. Further, this spot-to-spot intensity difference can vary, which makes the speckles appear to move.

Turning now to FIG. 1, illustrated therein is a prior art system 100 in which an observer 101 may perceive speckle. Specifically, a plurality of laser light sources 101, such as a red laser 102, a blue laser 103, and a green laser 104 are combined into a coherent, collimated beam 105. This collimated beam 105 is then directed to a modulation device 106. The modulation device 106 modulates the coherent beam 105 into a modulated coherent beam 107 capable of forming an image. This modulated coherent beam 107 is then delivered to a projection medium, such as the projection screen 108 shown in FIG. 1.

As the projection screen 108 is imperfect, i.e., as it includes tiny bumps and crevices, the reflected light 109 has portions that combine and portions that cancel. As a result, the observer 110 views an image 111 that appears to be speckled. The presence of speckle often tends to perceptibly degrade the quality of the image produced using the laser projection system.

Numerous attempts have been made to control speckle. Prior art speckle reduction systems include attempts to introduce angle diversity into the coherent beam, attempts to introduce polarization diversity into the coherent beam, attempts to introduce wavelength diversity into the coherent beam, and so forth. Other devices employ diffusers, image displacing devices, and other complex systems. A drawback associated with each of these systems is that they add substantial cost and complexity to the overall system design. For instance, time-varying diffusers require parts that adversely affect the overall system size and complexity.

There is thus a need for an improved speckle-reducing system for use with laser-based projection systems such as those employing semiconductor-type lasers.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 10 illustrates a schematic diagram of a drive circuit and laser diode in accordance with embodiments of the invention.

FIG. 11 illustrates a schematic diagram of an alternate drive circuit and laser diode in accordance with embodiments of the invention.

Figure 1:
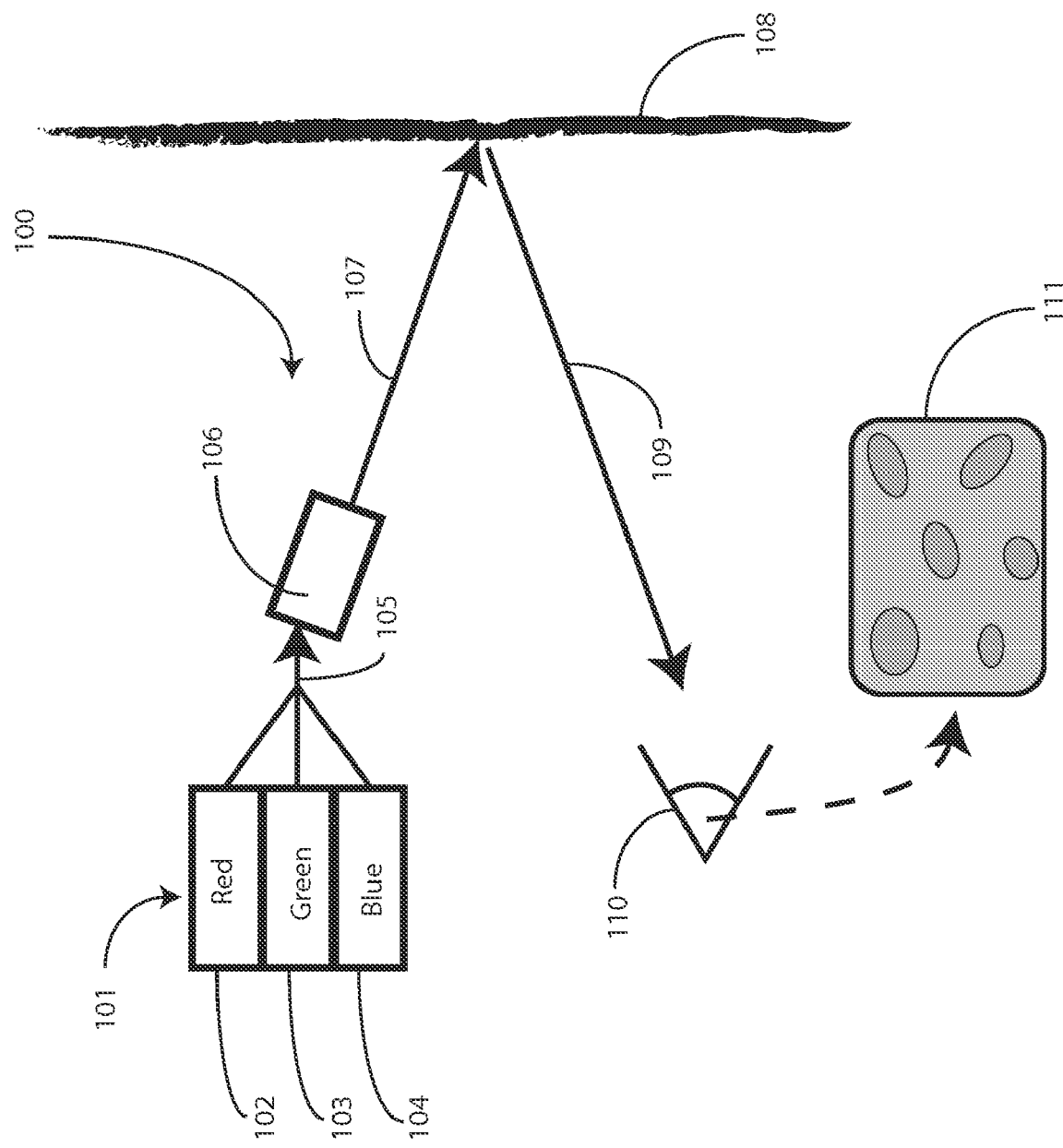
FIG. 1 illustrates a prior art image production system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to an imaging system configured to reduce perceived speckle. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of reducing speckle as described herein. The non-processor circuits may include, but are not limited to, microprocessors, scanning mirrors, image modulation devices, memory devices, clock circuits, power circuits, and so forth. As such, these functions may be interpreted as steps of a method to perform speckle reduction. Alternatively, some or all functions could be implemented by a state machine that has no stored program instructions, or in one or more application specific integrated circuits, in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide an image producing system that includes a plurality of laser sources, such as a red laser, a blue laser, and a green laser. In one embodiment, the red laser, green laser, and blue laser are each laser diodes. Drive circuitry provides a direct current drive signal to each laser source. For instance, the red laser may receive a first drive signal having a first amplitude, while the blue laser receives a second drive signal having a second amplitude, and so forth. The amplitude of each direct current drive signal is sufficient to cause each corresponding laser to emit light.

An alternating current drive circuit is then coupled to one or more of the laser sources. For example, in one embodiment a first alternating current drive circuit is coupled to the red laser, while a second alternating current drive circuit is coupled to the blue laser. Each alternating current drive circuit applies an alternating current drive signal to its corresponding laser source. The alternating current drive signal is a high frequency modulated signal, in the range of 500 MHz. The alternating current drive signal induces a controlled chaos into the emission of each laser, thereby broadening each laser's spectral bandwidth. The applied modulation is at a higher frequency than is the modulation of pixels in the image being produced. As such, the alternating current drive signal generally does not introduce any image artifacts.

The alternating current drive signal can be either additive or created by modulating the direct current drive signal. In one embodiment, the alternating current drive signal is superimposed on the direct current drive signal by way of a high-speed transistor coupled in parallel with the laser source. In another embodiment, the alternating current drive signal is created by "chopping" the direct current drive signal by coupling a high-speed transistor serially between the direct current drive circuit and its corresponding laser source. When the emitted light having the broadened spectral bandwidth is used in a projection system, perceived speckle is markedly reduced.

In one embodiment, a plurality of laser sources, e.g. a red laser, blue laser, and green laser, is configured to produce a plurality of light beams. Optical elements, such as dichroic mirrors, are then used to orient each of these light beams into a collimated, coherent light beam. A modulation device, such as a Microelectromechanical System (MEMS) scanning mirror, digital light projection (DLP) system, or other modulation device, modulates the collimated, coherent light beam to present an image on a projection medium or display surface.

Figure 2:
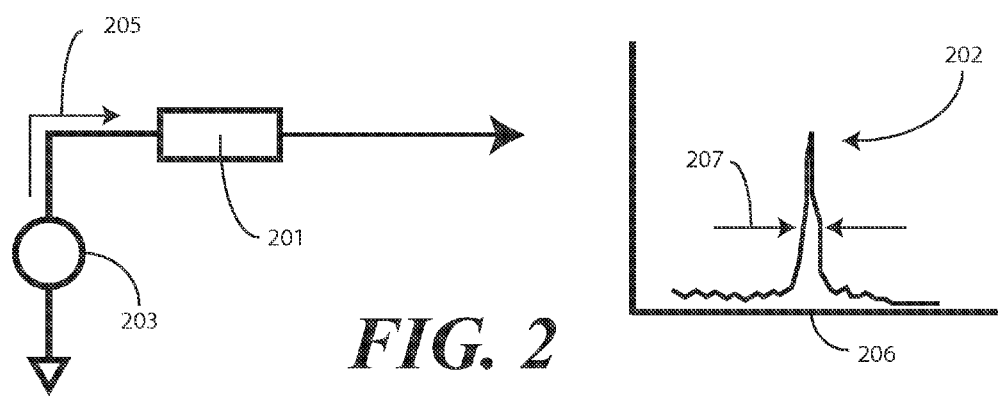
FIG. 2 illustrates a semiconductor-type laser suitable for use with embodiments of the present invention, along with a representation of its characteristic spectral width.
Figure 3:
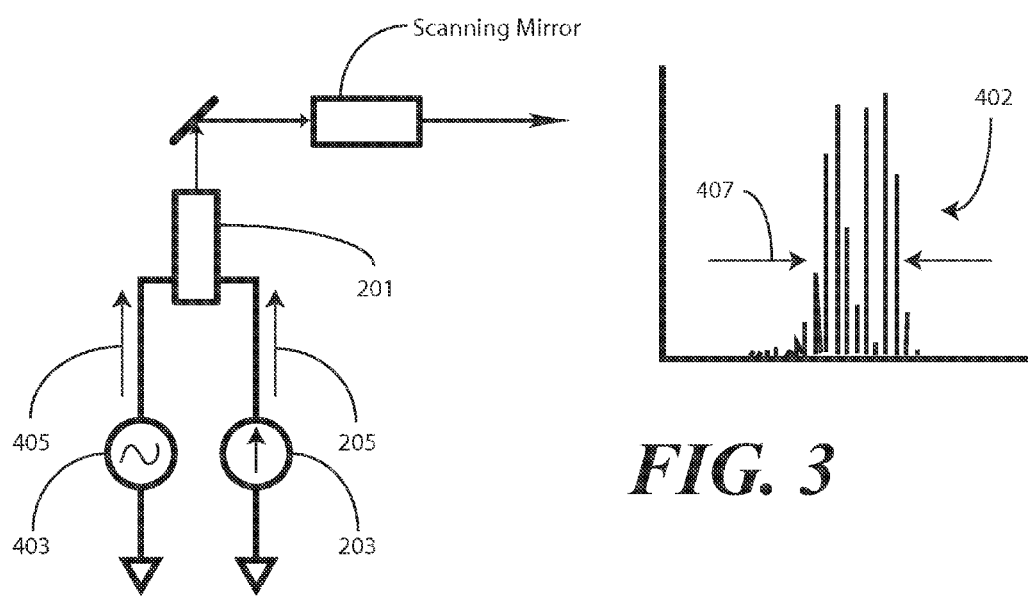
FIG. 3 illustrates a laser diode with a drive circuit in accordance with embodiments of the invention, along with a representation of the emitted spectral width.

Turning now to FIG. 2, illustrated therein is one embodiment of a laser source 201, such as a red or blue laser diode manufactured by Corning, Opnext, Novalux, or Nichia, and a graph of its characteristic output 202 when driven by a direct current drive circuit 203. The direct current drive circuit 203 delivers a direct current drive signal 205 to the laser source 201 in accordance with the laser source's operating specifications. For example, where the laser source 201 is a red laser, such as an HL63xx series laser diode manufactured by Opnext, the magnitude of the direct current drive signal 205 may be on the order of 180 mA. Where the laser source 201 is a blue laser, such as a NDB7212E manufactured by Nichia, the direct current drive signal 205 may be on the order of 110 mA. Were the laser source 201 a green laser, such as a G-120 manufactured by Corning, the direct current drive signal 205 may be on the order of 550 mA. The direct current drive signal 205 causes the laser source 201 to emit light.

Figure 4:
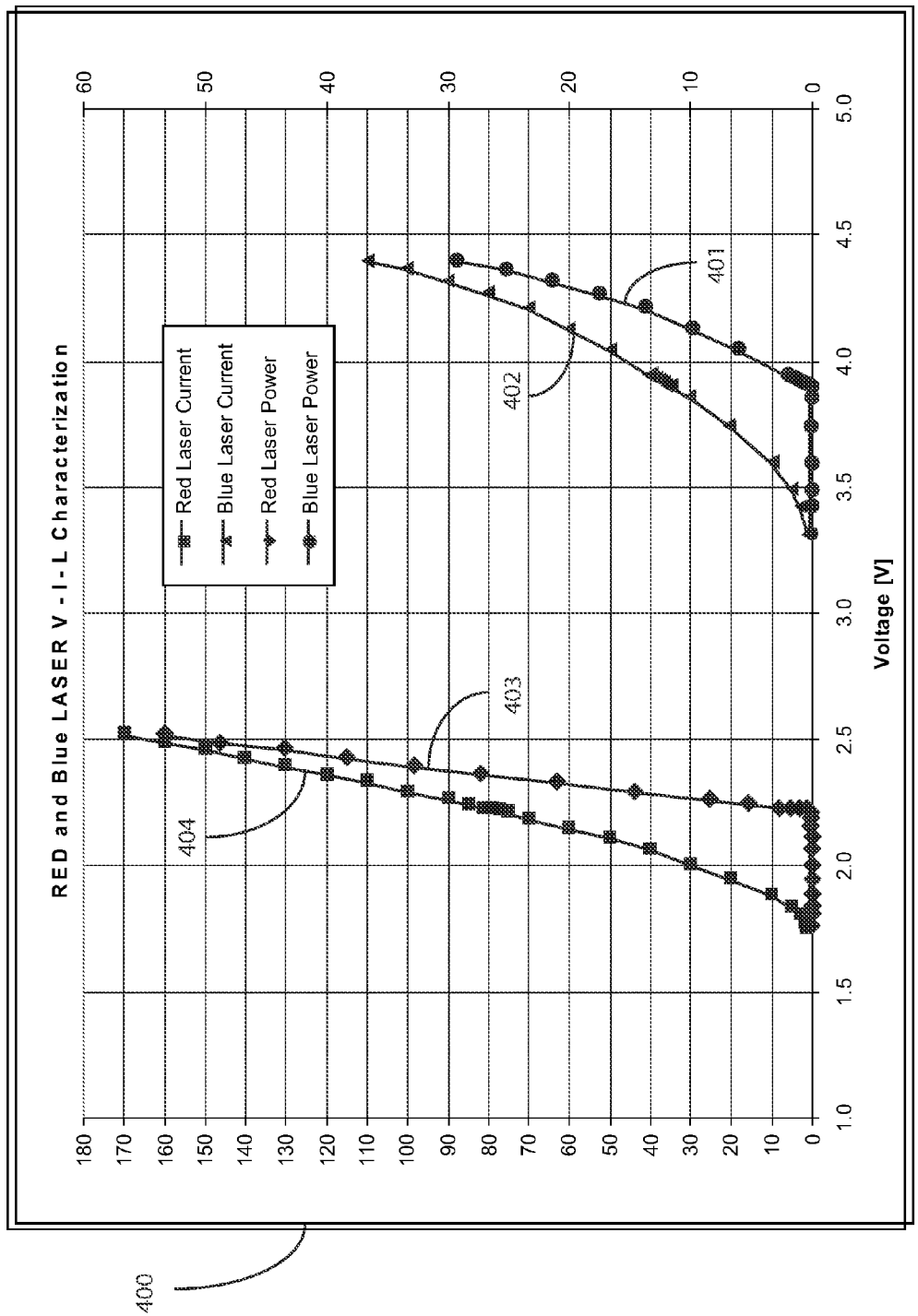
FIG. 4 illustrates a DC characterization of performance of a red laser and a blue laser suitable for use with embodiments of the invention.

The output power, current, and voltage for different laser sources will vary. Turning briefly to FIG. 4, illustrated therein is a graph 400 of voltage, current, and power corresponding to an exemplary red and blue diode, such as the HL63xx series red laser diode manufactured by Opnext and NDB7212E blue laser diode manufactured by Nichia, respectively. This graph 400 provides a reference of normal, direct current, operating performance of exemplary lasers suitable for use with embodiments of the invention. It will be clear to those of ordinary skill in the art having the benefit of this disclosure, however, that these particular laser sources are examples only. Other laser sources could equally be used. These particular laser sources simply provide a reference for discussing the various figures and embodiments herein.

Plot 401 shows the optical power produced by an the blue laser diode versus applied direct current voltage, while plot 402 shows the magnitude of the direct current drive signal delivered to the blue laser diode versus applied direct current voltage. Plot 403 shows the optical power produced by an the red laser diode versus applied direct current voltage, while plot 404 shows the magnitude of the direct current drive signal delivered to the red laser diode versus applied direct current voltage.

Turning now back to FIG. 2, the characteristic output 202 of the laser source 201 is centered about a relaxation oscillation frequency 206 and has a characteristic spectral linewidth 207 associated therewith. For a red typical semiconductor laser available from a given vendor, this spectral linewidth 202 may be roughly 10 MHz to 20 MHz. For the HL63xx series red laser diode, the spectral linewidth 202 is about 16 MHz. For a blue typical semiconductor laser available from a given vendor, this spectral linewidth 202 may be roughly 15 MHz to 25 MHz. For the HL63xx series red laser diode, the spectral linewidth 202 is about 22 MHz.

Turning now to FIG. 4, illustrated therein is the laser source 201 being driven in accordance with embodiments of the invention. Specifically, the direct current drive circuit 203 is coupled to the laser source 201 and is configured to deliver a direct current drive signal 205 to the laser source. The direct current drive signal 205 has amplitude that is sufficient to cause the laser source 201 to emit light. This amplitude may be less than the normal direct current operating level described above because a modulated drive circuit also delivers a drive signal to the laser source 201.

Specifically, an alternating current drive circuit 403 is also coupled to the laser source 201. The alternating current drive circuit 403 is configured to deliver an alternating current drive signal 405 to the laser source 201. In one embodiment, the alternating current drive circuit 403 delivers the alternating current drive signal 405 to the laser source 201 in addition to the direct current drive signal 205. For example, the alternating current drive circuit 403 can be a high-frequency current source that injects current into the laser source 201, while the direct current drive circuit 203 is a DC current source doing the same. In another embodiment, the alternating current drive circuit 403 delivers the alternating current drive signal 405 to the laser source 201 by modulating the direct current drive signal 205. For example, the alternating current drive circuit 403 can be configured as a high-frequency transistor coupled serially between the direct current drive circuit 203 and the laser source 201. Examples of each of these embodiments will be shown in more detail in FIGS. 10 and 11 below.

In one embodiment, the alternating current drive signal 405 has a frequency of between 350 and 600 MHz, such as 500 MHz. The duty cycle of the alternating current drive signal 405 is between forty and sixty percent, such as fifty percent. The amplitude of the alternating current drive signal 405 will depend upon the color, type, or configuration of the laser source 201. For example, for a red laser source such as the HL63xx series red laser diode, the alternating current drive signal 405 may have a peak-to-peak voltage of between three and four volts. For the NDB7212E blue laser diode, may have a peak-to-peak voltage of between two and three volts.

As noted above, since in one embodiment both the direct current drive circuit 203 and the alternating current drive circuit 405 are delivering drive signals to the laser source 201, the amplitude of the direct current drive signal 205 may need to be reduced from that discussed above. For example, where the alternating current drive circuit 403 is delivering the alternating current drive signal 405 in addition to the direct current drive signal 205, the direct current drive signal 205 may be scaled down. In the case of the HL63xx series red laser diode, the direct current drive signal 205 may be scaled to between 80 mA and 180 mA. For the NDB7212E blue laser diode, the direct current drive signal 205 may be scaled to between 50 mA and 90 mA. The amount of scaling will depend upon the application and the amplitude of the alternating current drive signal 405.

Where the laser source 201 is driven in accordance with embodiments of the invention, the spectral width 407 of the emitted spectrum 402 is significantly broadened. This broadening comes from a destabilization of the modes of the laser source 201, which results in less perceived speckle when the laser source 201 is used in an image producing system. When used with red laser diodes, the emitted spectral width 407 can be more than double the characteristic spectral width (207). For a blue laser diode, the emitted spectral width 407 can be more than double the characteristic spectral width (207) as well.

Note that in a three laser system, such as one employing a red laser, green laser, and blue laser, one or more of the lasers can be driven with the direct current drive circuit 203 and the alternating current drive circuit 403 in accordance with embodiments of the invention to broaden the spectral width of each laser and to decrease perceived speckle. For example, in one embodiment, the red laser can be driven with the direct current drive circuit 203 and the alternating current drive circuit 403, while the blue and green lasers are driven only with direct current drive circuits. In another embodiment, both the blue laser and the red laser can be driven with the direct current drive circuit 203 and the alternating current drive circuit 403, while the green laser is driven conventionally. In a third embodiment, each of the red, green, and blue lasers can be driven with both direct current drive circuits 203 and the alternating current drive circuits. 403.

Experimental testing has shown, however, that broadening of the spectral width of a green laser, when driven by a direct current drive circuit 203 and an alternating current drive circuit 403 in accordance with embodiments of the invention, is not as extensive as is the broadening of the spectral width exhibited by the red laser and the blue laser. Only when the green laser is heavily driven by the alternating current drive circuit 403 does substantial broadening of the green laser's spectral width appear. Further, the human eye is not as perceptive to green as red. As such, significant speckle reduction can be obtained by driving at least the red, and even the blue and red, lasers with direct current drive circuits 203 and alternating current drive circuits 403. However, driving the green laser with the alternating current drive circuit 403 yields only marginal additional speckle reduction.

Figure 5:
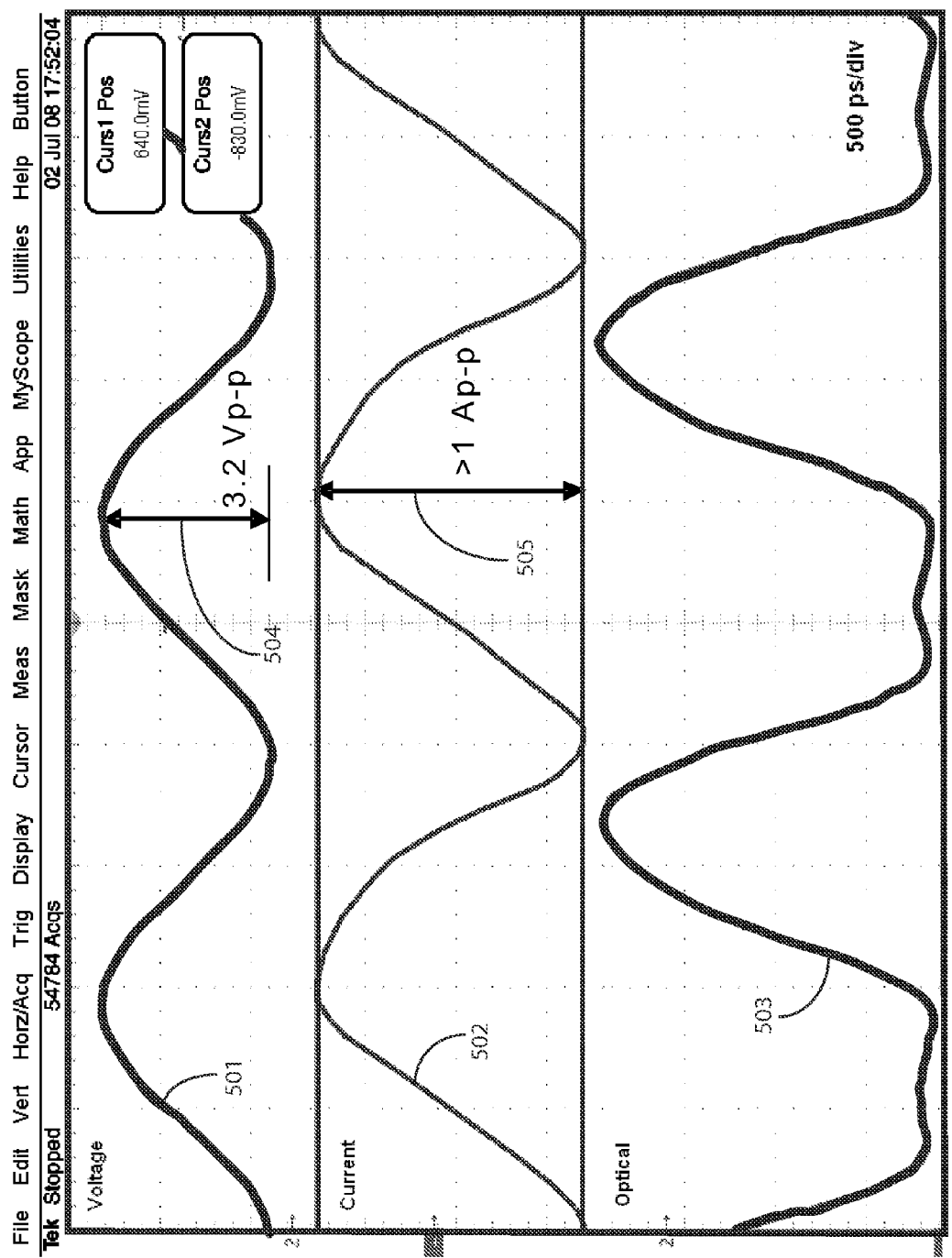
FIG. 5 illustrates exemplary drive signals for a red laser configured in accordance with embodiments of the invention.
Figure 6:
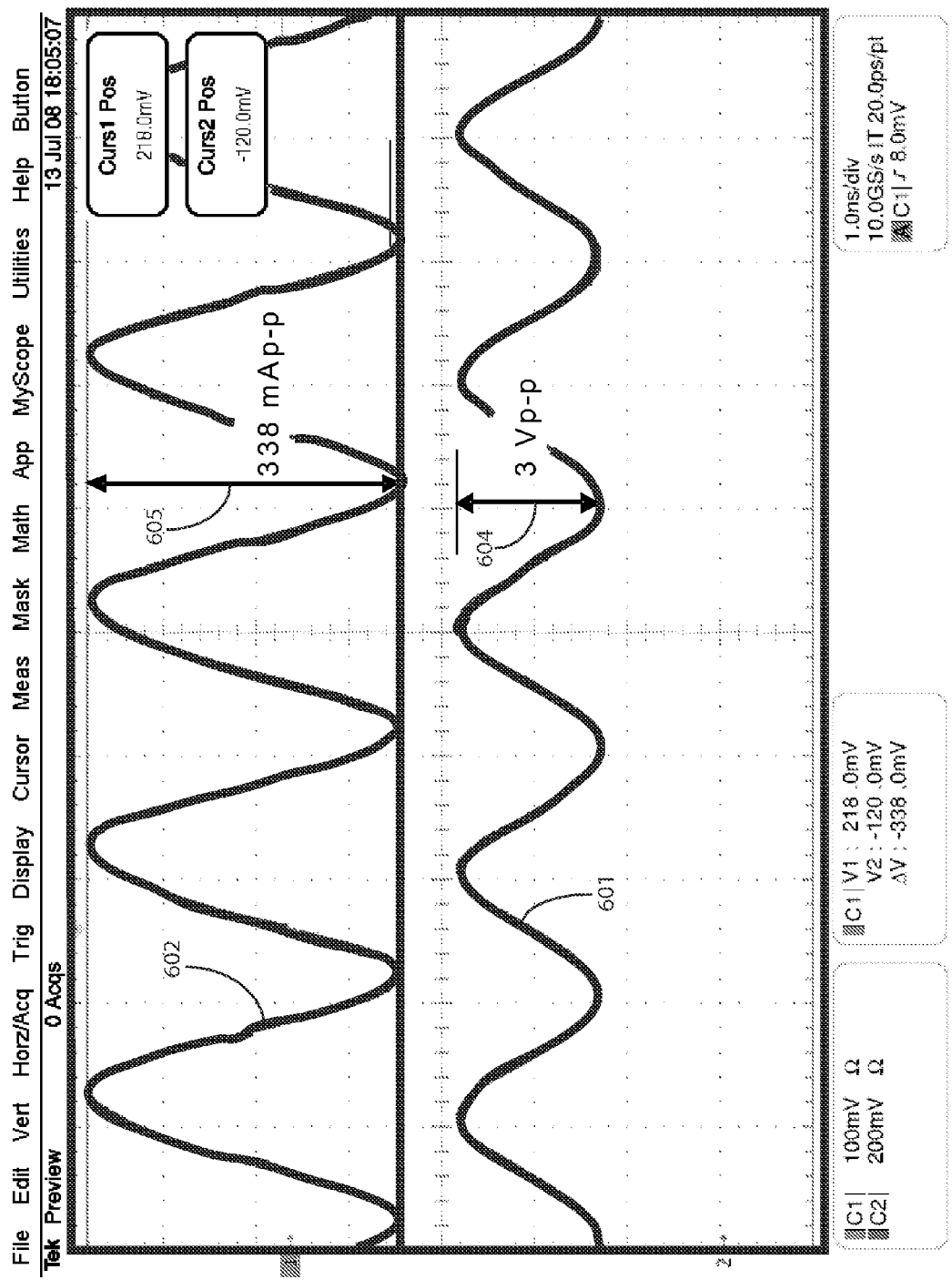
FIG. 6 illustrates exemplary drive signals for a blue laser configured in accordance with embodiments of the invention.
Figure 7:
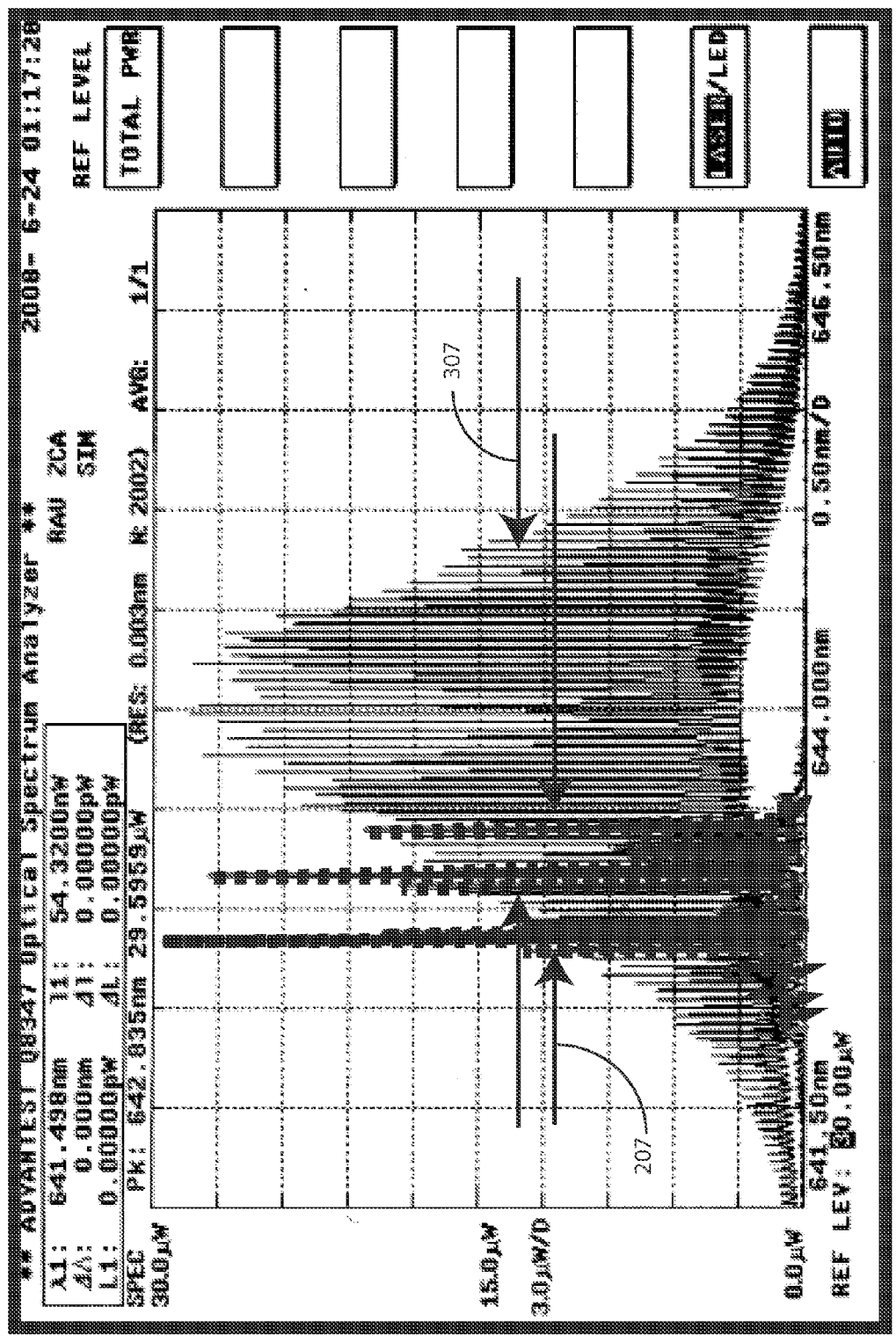
FIG. 7 illustrates experimental results of a red laser driven in accordance with embodiments of the invention and its corresponding spectral width increase.
Figure 8:
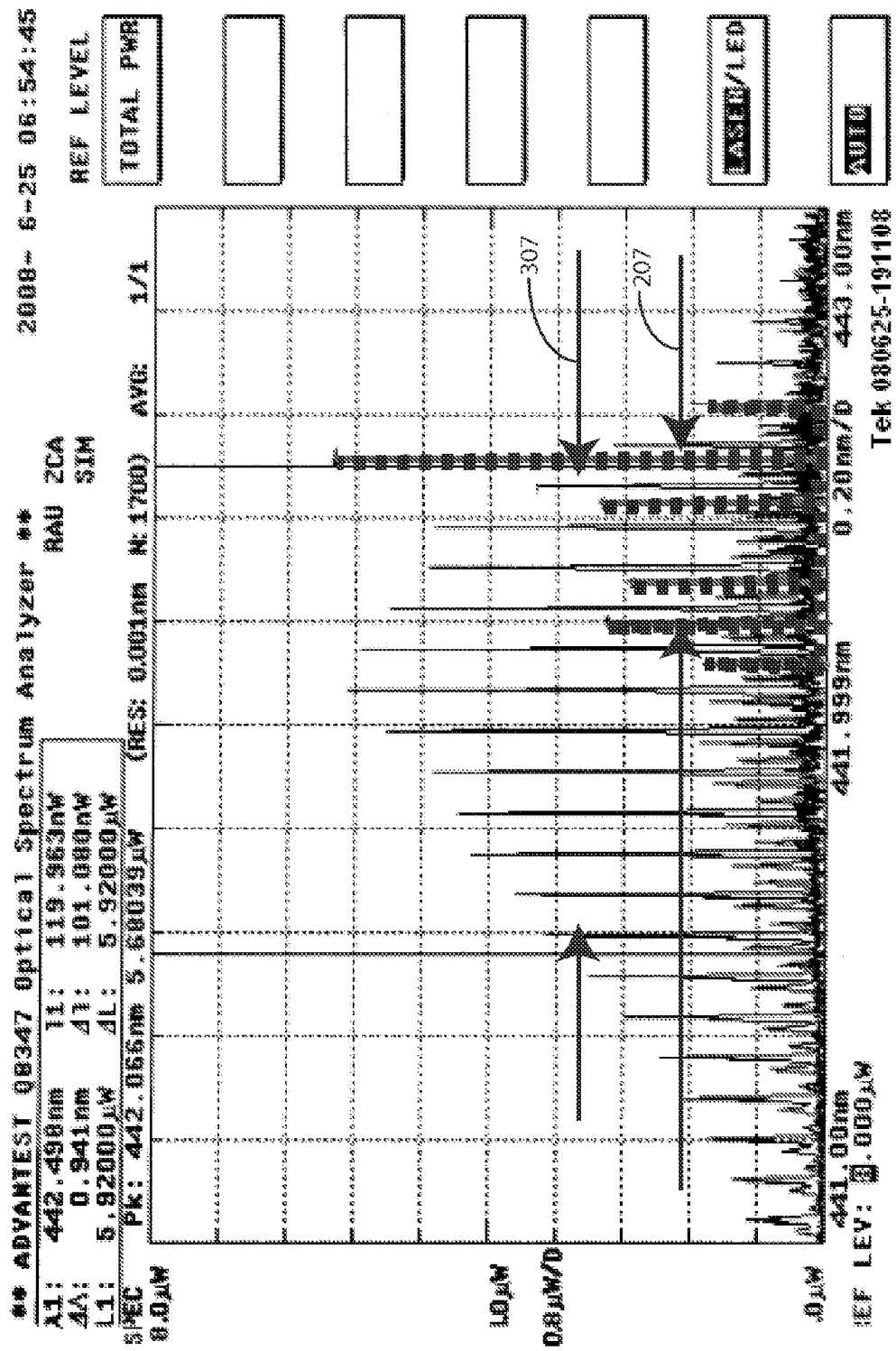
FIG. 8 illustrates experimental results of a blue laser driven in accordance with embodiments of the invention and its corresponding spectral width increase.

Turning now to FIGS. 5-8, illustrated therein are exemplary drive signals and corresponding emission spectra from the illustrative HL63xx red laser diode and the NBD7212E blue laser diode in accordance with embodiments of the invention. FIG. 5 illustrates drive signals for the red laser source, while FIG. 6 illustrates drive signals for the blue laser source. FIG. 7 illustrates an emitted spectrum from the red laser source when driven in accordance with embodiments of the invention, while FIG. 8 illustrates the same for the blue laser source.

Beginning with FIG. 5, illustrated therein is a voltage waveform 501, a current waveform 502, and an optical output power waveform 503 for an exemplary red laser being driven in accordance with embodiments of the invention. The voltage waveform 501 and current waveform 502 are representations of the sum of the alternating current drive signal (405) and the direct current drive signal (205) being delivered to the red laser source.

Using the HL63xx series red laser diode as an illustrative laser source, as shown in the voltage waveform 501 and the current waveform 502, the laser source is driven with a direct current drive signal (205) of 150 mA. For testing, the alternating current drive signal (405) is being applied with a signal generator having an attenuator and amplifier coupled to its output. The signal generator is configured to deliver a 500 MHz alternating current drive signal (405) with an output of −6 dBm. The attenuator is set at 15 dB and the amplifier is set to 45 dB. The duty cycle is approximately fifty percent.

The alternating current drive signal (405) has a peak-to-peak voltage 504 of between three and four volts. Specifically, the peak-to-peak voltage 504 measured here is 3.2 volts.

The drive current flowing in the red laser resulting from the direct current drive signal (205) and the alternating current drive signal (405) has peak-to-peak amplitude 505 of greater than one Amp. Note that the frequency of modulation—500 MHz—is much faster than the modulation of pixels or images were the red laser being used in an image producing system. As such, no visual artifacts occur.

Turning now to FIG. 6, illustrated therein is a voltage waveform 601 and a current waveform 602 for an exemplary blue laser being driven in accordance with embodiments of the invention. The voltage waveform 601 and current waveform 602 are representations of the sum of the alternating current drive signal (405) and the direct current drive signal (205) being delivered to the red laser source.

Using the NBD7212E blue laser diode as an illustrative laser source, as shown in the voltage waveform 601 and the current waveform 602, the laser source is driven with a direct current drive signal (205) of 70 mA. The test set-up is substantially the same as with FIG. 5. The alternating current drive signal (405) has a frequency of approximately 500 MHz, with a duty cycle of approximately fifty percent.

The alternating current drive signal (405) has a peak-to-peak voltage 604 of between two and four volts. Specifically, the peak-to-peak voltage 604 measured here is 3 volts. The drive current flowing in the red laser resulting from the direct current drive signal (205) and the alternating current drive signal (405) has peak-to-peak amplitude 605 of approximately 338 mA.

Turning now to FIG. 7, illustrated therein is a superposition of the characteristic spectral width 207 and the emitted spectral width 307 of a red laser driven in accordance with embodiments of the invention. As can be seen, substantial broadening of the spectral width has occurred due to the application of the alternating current drive signal (405). Specifically, the amplitude of the alternating current drive signal (405) has been increased to an amount sufficient to cause the emitted red spectral width 307 to be more than twice that of the characteristic spectral width 207. In particular, the characteristic spectral width 207 is about 0.65 nm. Upon application of the alternating current drive signal (405), the spectral width grows to 1.8 nm. The 500 MHz modulation causes the spectrum to grow considerably. The spectral ratio between the characteristic spectral width 207 and the emitted spectral width 307 is roughly 0.28 percent.

Turning now to FIG. 8, illustrated therein is a superposition of the characteristic spectral width 207 and the emitted spectral width 307 of a blue laser driven in accordance with embodiments of the invention. As can be seen, substantial broadening of the spectral width has occurred due to the application of the alternating current drive signal (405). Specifically, the amplitude of the alternating current drive signal (405) has been increased to an amount sufficient to cause the emitted blue spectral width 307 to be more than twice that of the characteristic spectral width 207. In particular, the characteristic spectral width 207 is about 0.44 nm. Upon application of the alternating current drive signal (405), the spectral width grows to 1.38 nm. The 500 MHz modulation causes the spectrum to grow considerably. The spectral ratio between the characteristic spectral width 207 and the emitted spectral width 307 is roughly 0.30 percent.

Figure 9:
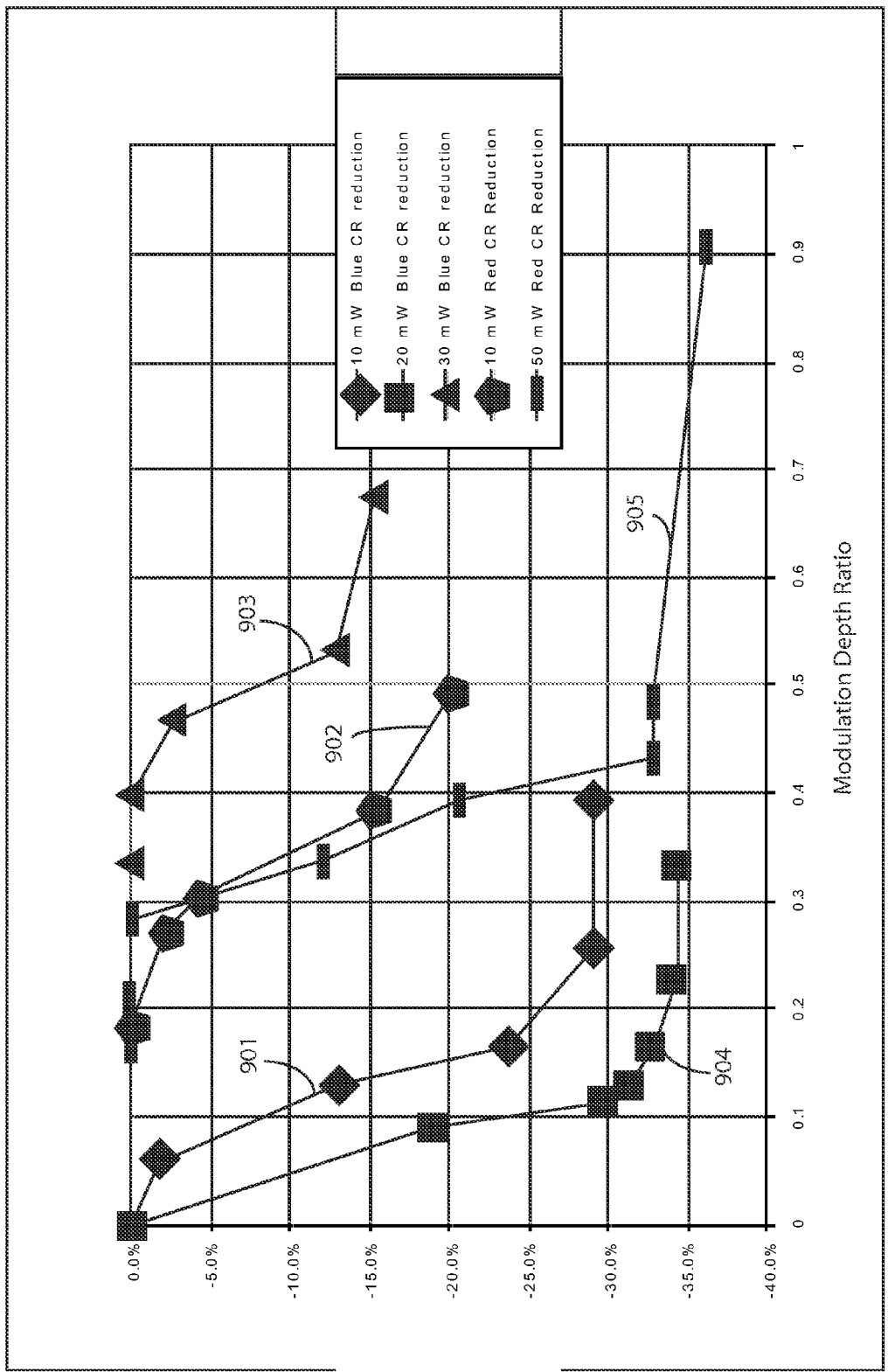
FIG. 9 illustrates the reduction in contrast ratio of red and blue lasers driven in accordance with embodiments of the invention.

Turning now to FIG. 9, illustrated therein is a graph showing how the increased spectral width leads to decreased speckle. Specifically, FIG. 9 illustrates several curves corresponding to varying amounts of alternating current drive signal (405) being applied to each laser source. Curves 901, 902, and 903 correspond to the blue laser being driven from the combination of the direct current drive circuit (203) and the alternating current drive circuit (403) at 10 mW, 20 mW, and 30 mW, respectively. Curves 904 and 905 correspond to the red laser being driven from the combination of the direct current drive circuit (203) and the alternating current drive circuit (403) at 10 mW and 50 mW, respectively. The red and blue laser diodes are biased with the direct current drive signal (205) and the emitted light is shined directly onto a white paper for measurement. The alternating current drive signal (405) is then applied as a sine wave at 500 MHz. The amplitude of alternating current drive signal (405) is changed and the contrast ratio is observed.

As can be seen in the graph, the contrast ratio of both the red laser, e.g., curve 904, and the blue laser, e.g., curve 901 can be reduced by twenty percent or more by increasing the amplitude of the alternating current drive signal (405). In one embodiment of the invention, the amplitude of the alternating current drive signal (405) is sufficient to cause an emitted red contrast ratio of the red laser to be reduced by at least twenty percent. In one embodiment of the invention, the amplitude of the alternating current drive signal (405) is sufficient to cause an emitted red contrast ratio of the red laser to be reduced by at least ten percent. As contrast ratio corresponds to perceived speckle, experimental testing shows the red laser yielding up to thirty-five percent of speckle reduction, while the blue laser yields up to thirty percent of speckle reduction. Note that the absolute maxima are not illustrated by these experimental results. For example, the blue laser could be driven "harder" with the 500 MHz sine wave, thereby potentially showing more contrast ratio reduction.

Turning now to FIG. 10, illustrated therein is one example of how a drive circuit in accordance with embodiments of the invention can be configured. Specifically, in FIG. 10, the laser source 201 is driven actively by a direct current drive circuit 203, shown as a direct current current source, and an alternating current drive circuit 403, shown as an alternating current current source. In such an embodiment, the alternating current drive circuit 403 delivers the alternating current drive signal (405) to the laser in addition to the direct current drive signal (205).

Turning now to FIG. 11, illustrated therein is an alternate embodiment of a drive circuit in accordance with embodiments of the invention. In FIG. 11, the alternating current drive circuit 403 modulates the direct current drive signal 205 delivered to the laser source 201 "passively" by shunting current about the laser source 201. The direct current drive circuit 203 delivers a direct current drive signal 205 having amplitude sufficient to cause the laser source 201 to emit light. An ultra high frequency transistor 1101, capable of switching in the range of 500 MHz, is coupled in parallel with the laser source 201. By switching the transistor 1101, the laser is modulated by the alternating current drive circuit 403.

Figure 12:
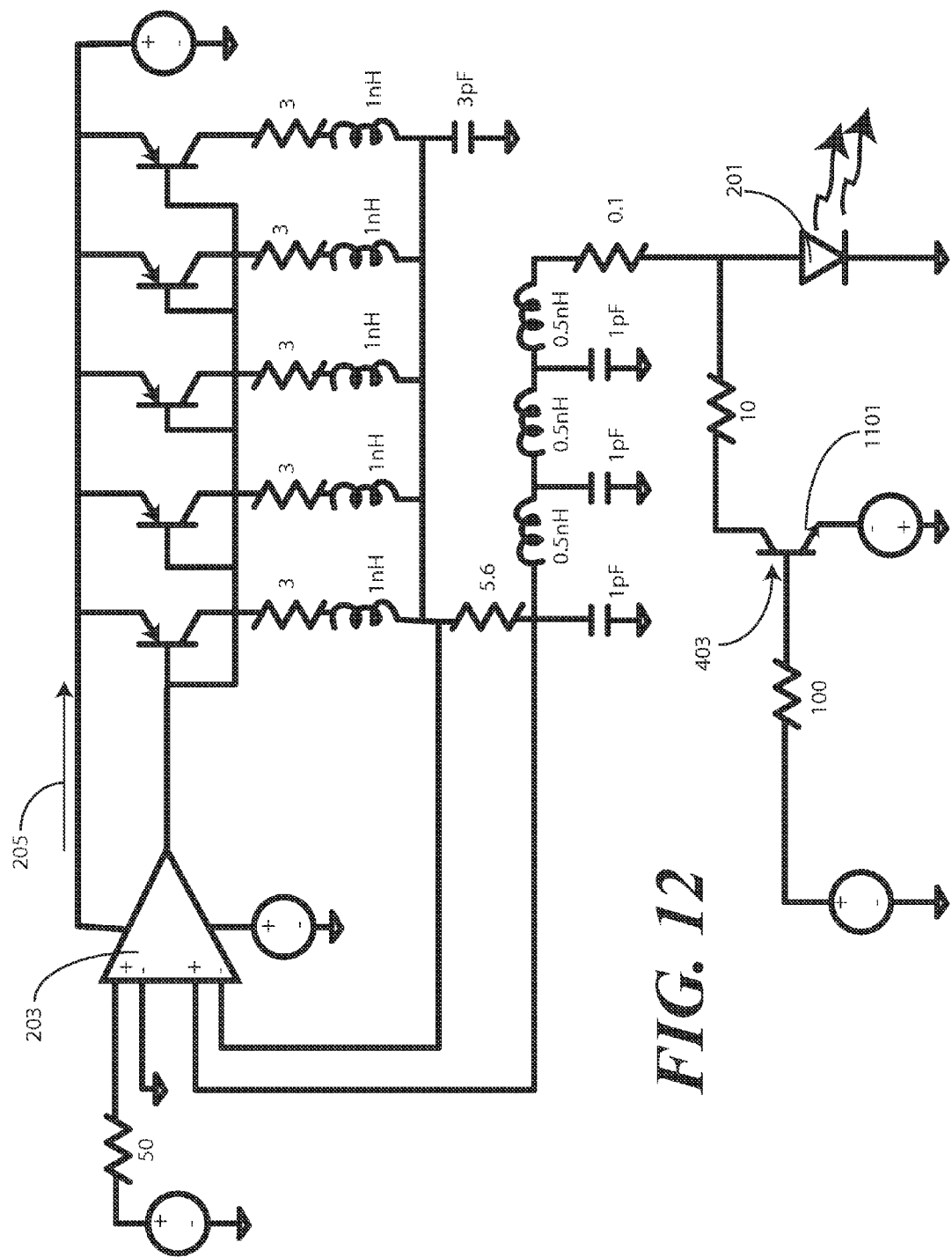
FIG. 12 illustrates an exemplary schematic diagram of a drive circuit and laser diode in accordance with embodiments of the invention.

Turning now to FIG. 12, illustrated therein is a more specific implementation of the circuit of FIG. 11. Specifically, in FIG. 12, the direct current drive circuit 203 comprises an AD8130 Op-Amp configured as a current source. Various circuit components direct the direct current drive signal 205 to the laser source 201. A BFP450 transistor is configured as the ultra high frequency transistor 1101.

Turning now to FIG. 12, illustrated therein is yet another embodiment of a drive circuit in accordance with embodiments of the invention. In FIG. 12, the alternating current drive circuit 403 modulates the direct current drive signal 205 delivered to the laser source 201 "passively" by shunting current about the laser source 201. The direct current drive circuit 203 delivers a direct current drive signal 205 having amplitude sufficient to cause the laser source 201 to emit light. An ultra high frequency transistor 1101, capable of switching in the range of 500 MHz, is coupled in parallel with the laser source 201. By switching the transistor 1101, the laser is modulated by the alternating current drive circuit 403.

Figure 13:
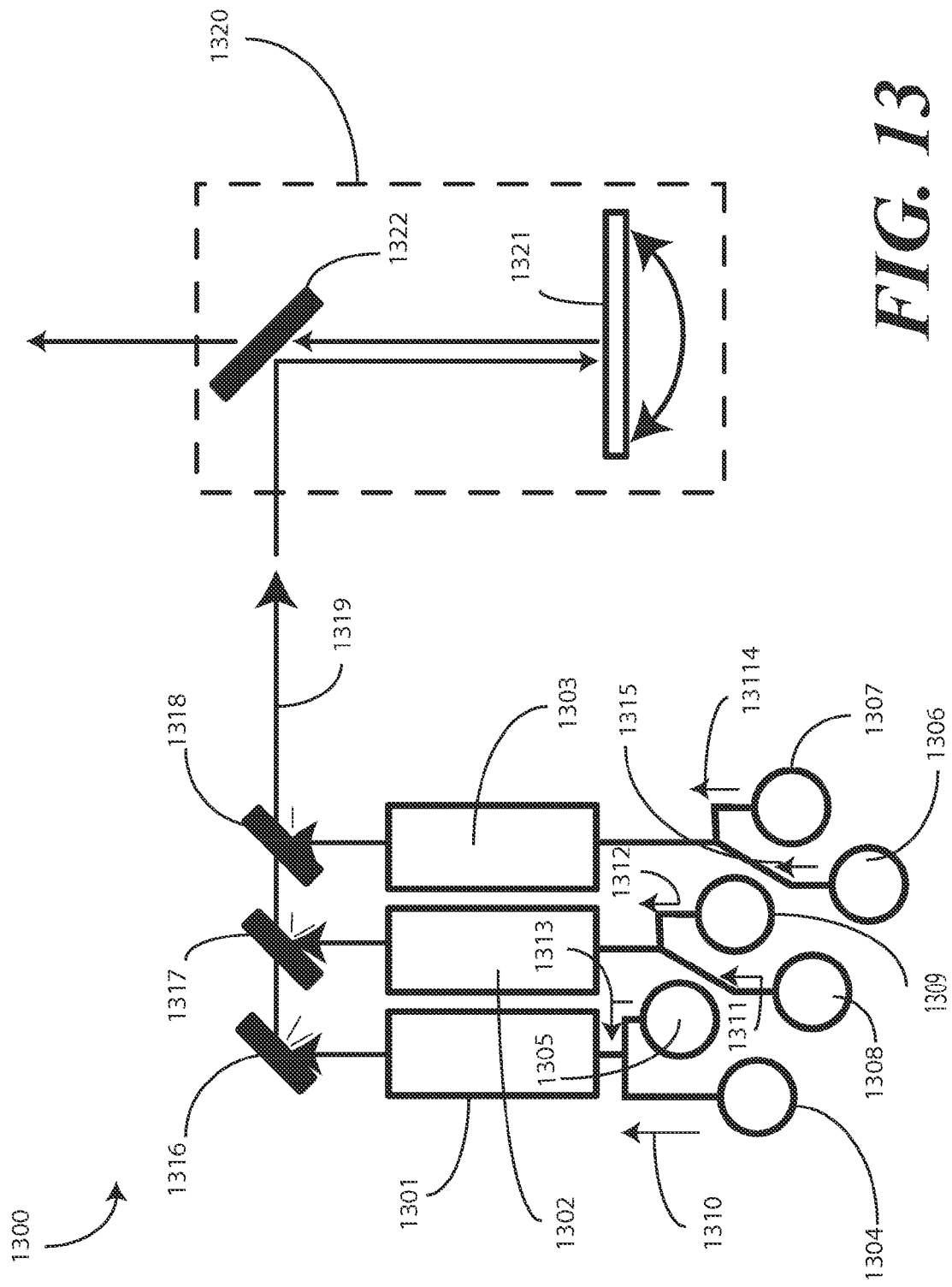
FIG. 13 illustrates one embodiment of an image producing system in accordance with embodiments of the invention.

Turning now to FIG. 13, illustrated therein is an image producing system 1300 using laser sources driven in accordance with embodiments of the invention. A plurality of laser sources includes a red laser 1301, a green laser 1302, and a blue laser 1303. These lasers can be edge emitting lasers or vertical cavity surface emitting lasers. In one embodiment, each laser is a semiconductor laser that is small and efficient. Such lasers are commonly available from a variety of manufacturers.

At least one of the laser sources is driven by both a direct current drive circuit 1304 and an alternating current drive circuit 1305. In one embodiment, only the red laser 1301 is driven by the direct current drive circuit 1304 and the alternating current drive circuit 1305. In another embodiment, the red laser 1301 is driven by a first direct current drive circuit 1304 and a first alternating current drive circuit 1305, while the blue laser 1303 is driven by a second direct current drive circuit 1306 and an alternating current drive circuit 1307. In yet another embodiment, the red laser 1301 is driven by a first direct current drive circuit 1304 and a first alternating current drive circuit 1305, while the blue laser 1303 is driven by a second direct current drive circuit 1306 and an alternating current drive circuit 1307, and the green laser 1302 is driven by a third direct current drive circuit 1308 and an alternating current drive circuit 1309. Note that the alternating current drive circuits 1305, 1307, 1309 can be configured as "active circuits" as shown in FIG. 10 or as "passive" circuits as shown in FIG. 11.

The direct current drive circuit 1304, 1306, 1308 for each laser source 1301, 1302, 1303 is configured to deliver direct current drive signals 1310, 1311, 1312 to the each laser source 1301, 1302, 1303 having an amplitude sufficient to cause the each laser source 1301, 1302, 1303 to emit light. The alternating current drive circuit 1305 coupled to the red laser 1301 is configured to one of deliver an alternating current drive signal 1313 to the red laser 1301 in addition to the direct current drive signal 1310 delivered to the red laser 1301, or to modulate the direct current drive signal 1310 delivered to the red laser 1301. Similarly, where used, the alternating current drive circuit 1307 of the blue laser 1303 is configured either to deliver a second alternating current drive signal 1314 to the blue laser 1303 in addition to the direct current drive signal 1312 delivered to the blue laser 1303 or modulate the direct current drive signal 1312 delivered to the blue laser 1303. If the green laser 1302 is modulated, a third alternating current drive circuit 1309 is configured to one of deliver a third alternating current drive signal 1315 to the green laser 1302 in addition to the direct current drive signal 1311 delivered to the green laser 1302 or modulate the direct current drive signal 1311 delivered to the green laser 1302.

One or more optical alignment devices 1316, 1317, 1318 are then used to orient light from the plurality of laser sources into a collimated light beam 1319. Where the plurality of laser sources comprise a red laser 1301, blue laser 1303, and green laser 1302, the one or more optical alignment devices 1316, 1317, 1318 can blend the output of each laser to form a coherent beam of white light. In one embodiment, dichroic mirrors can be used to orient the plurality of light beams into the collimated light beam 1319. Dichroic mirrors are partially reflective mirrors that include dichroic filters that selectively pass light in a narrow bandwidth while reflecting others. Dichroic mirrors and their use in laser-based projection systems are known in the art.

A light modulator 1320 is then configured to produce images by modulating the collimated light beam and delivering it to a display surface. In one embodiment, the light modulator 1320 comprises a MEMS scanning mirror 1321. Examples of MEMS scanning mirrors, such as those suitable for use with embodiments of the present invention, are set forth in commonly assigned, copending U.S. patent application Ser. No. 11/775,511, filed Jul. 10, 2007, entitled "Substrate-Guided Relays for Use with Scanned Beam Light Sources," which is incorporated herein by reference, and in US Pub. Pat. Appln. No. 2007/0159673, entitled, "Substrate-guided Display with Improved Image Quality," which is incorporated herein by reference. Embodiments of the invention are well suited for use with MEMS scanning mirrors as the overall system can be designed with a very small form factor, suitable for use in portable electronics such as mobile telephones, personal digital assistants, gaming devices, music players, multimedia devices, and so forth. However, it will be clear to those of ordinary skill in the art having the benefit of this disclosure that other light modulators, such as digital light projection modulators, may be used as well. Light is then directed from the MEMS scanning mirror 1321 through a partially reflective optical device 1322 to the projection surface.

Figure 14:
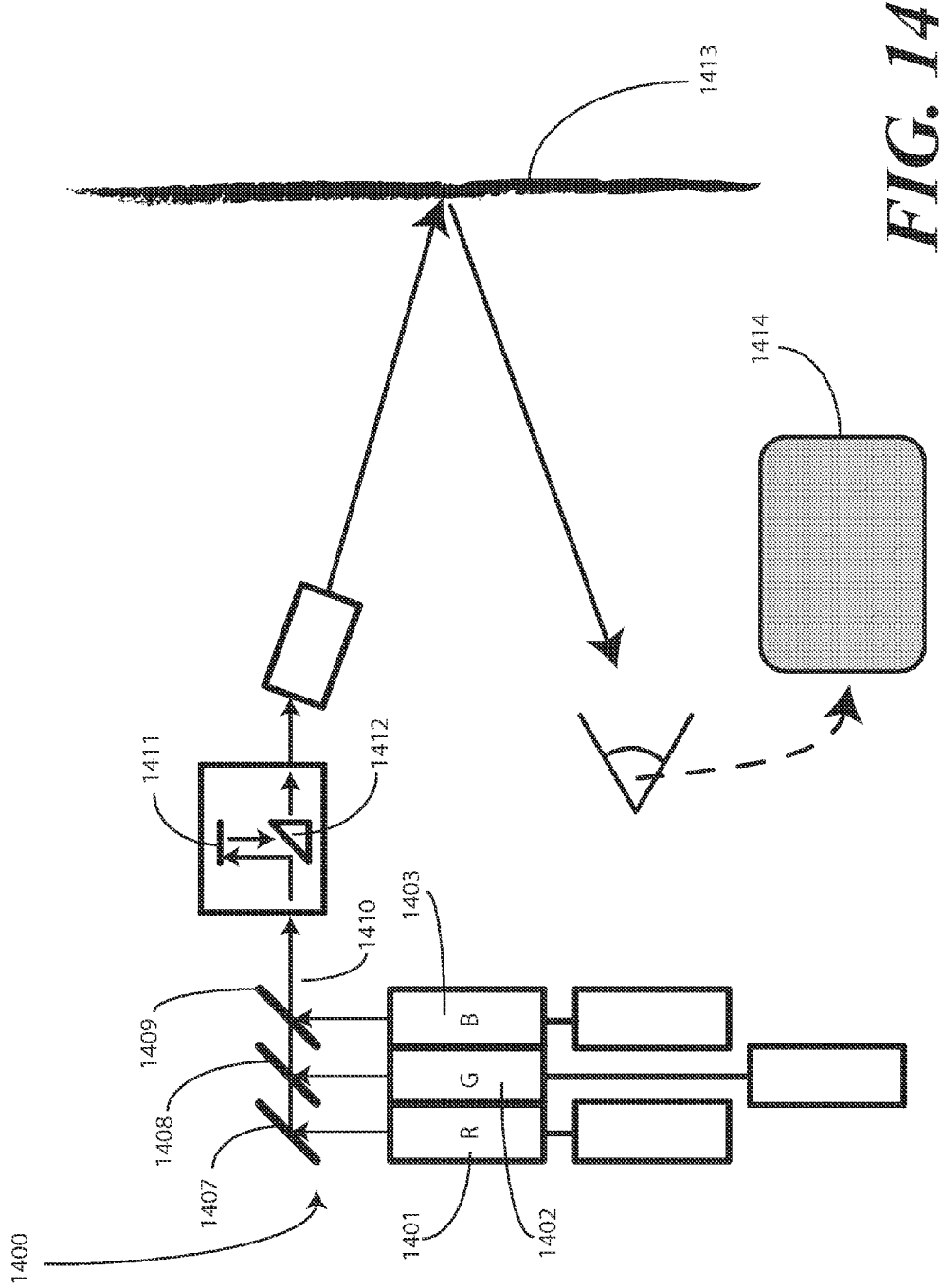
FIG. 14 illustrates one embodiment of an image producing system in accordance with embodiments of the invention.

Turning now to FIG. 14, illustrated therein is another image producing system 1400 in accordance with embodiments of the invention. Three laser light sources 1401, 1402, 1403, each laser light source having a characteristic spectral linewidth associated therewith, are coupled to respective drive circuits 1404, 1405, 1406. At least one of the drive circuits 1404, 1405, 1406 comprises both a direct current drive circuit (203) and an alternating current drive circuit (403), although two or more of the three drive circuits 1404, 1405, 1406 could include both a direct current drive circuit (203) and an alternating current drive circuit (403). Where less than all drive circuits 1404, 1405, 1406 have both a direct current drive circuit (203) and an alternating current drive circuit (403), those others include only a direct current drive circuit (203).

In one embodiment, the alternating current drive circuits (403) are used in conjunction with the red laser 1401 and the blue laser 1403 to modulate drive signals applied to those lasers. The alternating current drive circuits (403) can be configured as transistors coupled in parallel with each of the red laser 1401 and the blue laser 1403, or as current sources configured to deliver alternating current to each of the red laser 1401 and the blue laser 1403. The modulation comprises an alternating current drive signal (405) having a frequency of between 400 MHz and 600 MHz to each of the red laser 1401 and the blue laser 1403.

As with the system of FIG. 13, a plurality of optical alignment components 1407, 1408, 1409 is configured to direct output light from each of the three laser light sources along an optical axis 1410. This light gets delivered to a MEMS scanning mirror 1411, and then to a partially reflective optical device 1412 configured to direct the optical axis to the MEMS scanning mirror 1411 for modulation of the output light. Once modulated, the light is delivered to delivering it to a display surface 1413, thereby creating images 1414 with reduced speckle.

Figure 15:
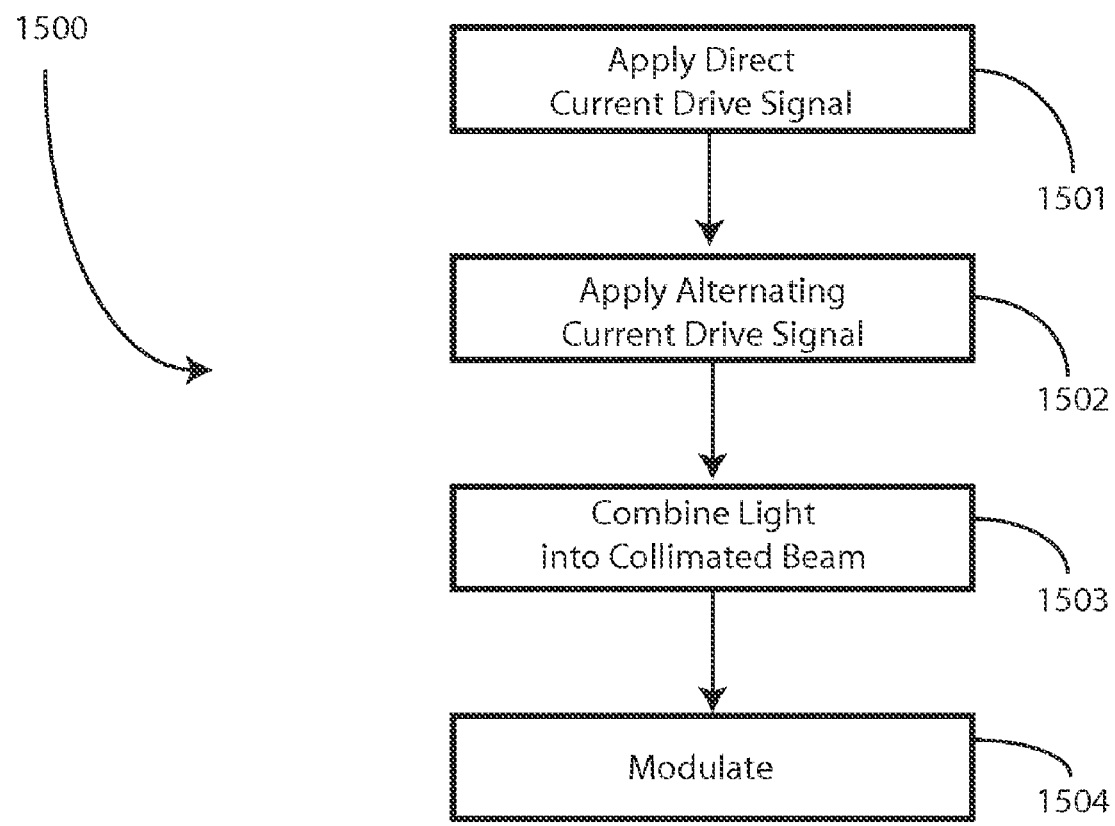
FIG. 15 illustrates one method of producing images in accordance with embodiments of the invention.

Now that the hardware is understood, note that some or all the functions of the hardware can be implemented by some software components as a method. Said differently, it will be appreciated that embodiments of the invention described herein may be comprised of one or more conventional processors and unique stored program instructions that control the one or more processors to implement, in conjunction with certain non-processor circuits, some, most, or all of the functions of reducing speckle as described herein. Turning now to FIG. 15, illustrated therein is one method 1500 of reducing speckle in accordance with embodiments of the invention.

The method 1500 is suitable for systems having a plurality of laser diodes having at least one red laser diode. As set forth above, the systems can additionally have blue or green laser diodes. While the method 1500, for discussion purposes, is directed to the red laser diode, it will be clear to those of ordinary skill in the art having the benefit of this disclosure that the method could equally be applied to other laser diodes, such as the blue or green laser diode.

At step 1501, the system applies a direct current drive signal to each of the plurality of laser diodes. The amplitude of this direct current drive signal is sufficient for each of the plurality of laser diodes to emit light. At step 1502, the system applies an alternating current drive signal having a frequency of between 400 MHz and 600 MHz and a duty cycle of between forty and sixty percent to the red laser diode. At step 1503, the system combines light emitted from each of the plurality of laser diodes into a collimated beam, such as with the use of dichroic mirrors. At step 1504, the system modulates the collimated beam to deliver the images. In one embodiment, this modulation is accomplished with a digital light processing modulator. In another embodiment, the step of modulating the collimated beam comprises scanning a MEMS mirror to create the images.

As noted above, while this method can be used for multiple laser systems. Accordingly, step 1502 can include not only applying an alternating current drive signal to the red laser, but to the blue laser as well. Specifically, step 1502 can include applying a second alternating current drive signal having a second frequency of between 400 MHz and 600 MHz and a second duty cycle of between forty and sixty percent to the at least one blue laser diode.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An image producing system, comprising:
a plurality of laser sources comprising at least a red laser, a blue laser, and a green laser,
a direct current drive circuit for each laser source configured to deliver direct current drive signals to the each laser source having an amplitude sufficient to cause the each laser source to emit light;
an alternating current drive circuit coupled to the red laser and configured to one of deliver an alternating current drive signal to the red laser in addition to the direct current drive signal delivered to the red laser or modulate the direct current drive signal delivered to the red laser;
one or more optical alignment devices configured to orient light from the plurality of laser sources into a collimated light beam; and
a light modulator configured to produce images with the collimated light beam;
wherein the alternating current drive signal has a frequency of between 350 and 600 MHz.

2. The image producing system of claim 1, wherein the red laser has a characteristic red contrast ratio associated therewith, wherein amplitude of the alternating current drive signal is sufficient to cause an emitted red contrast ratio of the red laser to be reduced by at least twenty percent.

3. The image producing system of claim 1, wherein the red laser has a characteristic red spectral width associated therewith, wherein amplitude of the alternating current drive signal is sufficient to cause an emitted red spectral width of the red laser to be at least twice the characteristic red spectral width.

4. The image producing system of claim 3, wherein the red laser comprises a laser diode, wherein the alternating current drive signal has a peak-to-peak voltage of between three and four volts.

5. The image producing system of claim 4, wherein amplitude of the direct current drive signal applied to the red laser is between 80 mA and 180 mA.

6. The image producing system of claim 3, wherein the alternating current drive signal has a duty cycle of between forty and sixty percent.

7. The image producing system of claim 3, wherein a drive current flowing in the red laser resulting from the direct current drive signal and the alternating current drive signal has a peak-to-peak amplitude greater than 1 Amp.

8. The image producing system of claim 1, wherein the alternating current drive circuit comprises an ultra high frequency switch coupled in parallel with the red laser.

9. The image producing system of claim 1, wherein the alternating current drive circuit comprises a current source coupled in parallel with the direct current drive circuit of the red laser.

10. The image producing system of claim 1, further comprising a second alternating current drive circuit coupled to the blue laser and configured one of deliver a second alternating current drive signal to the blue laser in addition to the direct current drive signal delivered to the blue laser or modulate the direct current drive signal delivered to the blue laser.

11. The image producing system of claim 10, wherein the blue laser has a characteristic blue contrast ratio associated therewith, wherein amplitude of the alternating current drive signal is sufficient to cause an emitted blue contrast ratio of the blue laser to be reduced by at least ten percent.

12. The image producing system of claim 10, wherein the blue laser has a characteristic blue spectral width associated therewith, wherein amplitude of the alternating current drive signal is sufficient to cause an emitted blue spectral width of the blue laser to be at least twice the characteristic blue spectral width.

13. The image producing system of claim 12, wherein the blue laser comprises a laser diode, wherein the alternating current drive signal has a peak-to-peak voltage of between two and four volts, further wherein amplitude of the direct current drive signal applied to the blue laser is between 50 mA and 90 mA.

14. The image producing system of claim 10, further comprising a third alternating current drive circuit coupled to the green laser and configured to one of deliver a third alternating current drive signal to the green laser in addition to the direct current drive signal delivered to the green laser or modulate the direct current drive signal delivered to the green laser.

15. The image producing system of claim 10, wherein the wherein the light modulator comprises a MEMS scanning mirror.

16. A method producing images having reduced speckle from an image producing system comprising a plurality of laser diodes having at least one red laser diode, the method comprising the steps of:
  applying a direct current drive signal to each of the plurality of laser diodes;
  applying an alternating current drive signal having a frequency of between 400 MHz and 600 MHz and a duty cycle of between forty and sixty percent to the at least one red laser diode;
  combining light emitted from each of the plurality of laser diodes into a collimated beam; and
  modulating the collimated beam to deliver the images.

17. The method of claim 16, wherein the plurality of laser diodes comprises at least one blue laser diode, further comprising the step of applying a second alternating current drive signal having a second frequency of between 400 MHz and 600 MHz and a second duty cycle of between forty and sixty percent to the at least one blue laser diode.

18. The method of claim 17, wherein the step of modulating the collimated beam comprises scanning a MEMS mirror to create the images.

19. An image producing system, comprising:
  three laser light sources, each laser light source having a characteristic spectral linewidth associated therewith, wherein at least one of the three laser light sources is a red laser and at least another of the three laser light sources is a blue laser;
  a drive circuit for each of the three laser light sources configured to deliver a direct current drive signal to each of the three laser light sources;
  a modulation circuit for each of the red laser and the blue laser configured to deliver an alternating current drive signal having a frequency of between 400 MHz and 600 MHz to each of the red laser and the blue laser;
  a plurality of optical alignment components configured to direct output light from each of the three laser light sources along an optical axis;
  a MEMS scanning mirror; and
  a partially reflective optical device configured to direct the optical axis to the MEMS scanning mirror for modulation of the output light.

20. The image producing system of claim 19, wherein the modulation circuit for each of the red laser and the blue laser comprises one of transistors coupled in parallel with each of the red laser and the blue laser or current sources configured to deliver alternating current to each of the red laser and the blue laser.

* * * * *